United States Patent [19]

Nakamura et al.

[11] Patent Number: 4,572,866

[45] Date of Patent: Feb. 25, 1986

[54] MAGNETIC RECORDING MEDIUM

[75] Inventors: Issei Nakamura; Kenji Itozawa, both of Hachioji, Japan

[73] Assignee: Konishiroku Photo Industry Co., Ltd., Tokyo, Japan

[21] Appl. No.: 545,662

[22] Filed: Oct. 26, 1983

[30] Foreign Application Priority Data

Oct. 29, 1982 [JP] Japan .................................. 57-190275

[51] Int. Cl.$^4$ ............................................... G11B 5/68
[52] U.S. Cl. .................................. 428/328; 252/62.54; 252/62.55; 360/134; 360/135; 360/136; 427/128; 427/131; 427/44; 428/694; 428/900; 428/457
[58] Field of Search ............... 428/694, 900, 328, 457; 422/128, 131, 132, 44; 252/62.55, 62.54; 75/0.5 AA; 360/134, 136

[56] References Cited

U.S. PATENT DOCUMENTS

| 3,702,270 | 11/1972 | Kawasaki | 252/62.55 |
| 4,246,316 | 1/1981 | Aonuma et al. | 428/329 |
| 4,262,037 | 4/1981 | Asada et al. | 427/130 |
| 4,267,207 | 5/1981 | Sasazawa et al. | 427/132 |
| 4,273,807 | 6/1981 | Berry | 427/132 |
| 4,396,668 | 8/1983 | Saito et al. | 428/220 |
| 4,480,004 | 10/1984 | Togawa | 428/328 |

Primary Examiner—Ellis P. Robinson
Attorney, Agent, or Firm—Frishauf, Holtz, Goodman & Woodward

[57] ABSTRACT

A magnetic recording medium comprising a support and a magnetic layer on said support. Said magnetic layer is a unitary magnetic layer comprising ferromagnetic metallic powder. The average grain size of said ferromagnetic powder is not more than 0.5$\mu$, the ratio of the major axis to the minor axis (acicular ratio) of said powders is from 1.3 to 4.5 and the coercive force of said powders is from 550 to 800 Oe.

20 Claims, No Drawings

MAGNETIC RECORDING MEDIUM

BACKGROUND OF THE INVENTION

This invention is concerned with improvements in magnetic recording media and particularly with the magnetic recording media capable of making magnetic recordings of high density and high resolution in the present video systems.

In order to improve the recording density of a magnetic recording medium and to increase the sensitivity thereof, such a non-magnetic support as polyethylene terephthalate, cellulose triacetate base or the like has been coated with a magnetic layer comprising ferromagnetic powder and binders both of which have been kneaded together. The ferromagnetic powder should have high residual magnetic flux density Br, ratio of the Br to saturation magnetic flux density Bm and coercive force Hc, respectively. The binders include vinyl chloridevinyl acetate copolymer, butyl acrylate-acrylonitrile copolymer, cellulose resin, polyurethane resin and the like. To serve as the ferromagnetic powder, it is advantageous from the viewpoint of magnetic characteristics such as Br/Bm, Br, Hc and the like to use a cobalt adsorbed iron oxide such as Co adsorbed $\gamma$-Fe$_2$O$_3$ or metal magnetic powder. However, the conventional magnetic powder is an acicular crystal and if they are more finely granulated to increase the resolution power, there can be obtained those having the longer axis of 0.3 to 0.9$\mu$ and the shorter axis of 0.05 to 0.1$\mu$ in length, and the ratio of such longer axis to the shorter axis, i.e., the acicular ratio is of the order of 5 to 10. Meanwhile, the Hc of these conventional metal magnetic powder is increased as they are granulated to saturate the head of video deck to a value too great to use with the present video systems.

In magnetic powder of conventional Co adsorbed iron oxide having a high acicular ratio, such as Co-adsorbed $\gamma$-Fe$_2$O$_3$, the saturation magnetization $\sigma$s is decreased as the powder is finely granulated, and the high acicular ratio magnetic grains are easily broken to cause an uneven distribution of Hc in the magnetic layer, that is a cause of image transfer between laminated magnetic layers.

When using powder having a high acicular ratio, it is required to strengthen the oriented magnetic field because of the necessity of increasing the degree of orientation. As a result, the grains are stuck together, so that the surface of the magnetic layer is roughened. Such powder also tend to decrease in saturation magnetization $\sigma$s and not to be suitable for a high sensitivity and high density recording, as they become finer. It is a matter of course in the case of Co-adsorbed iron oxide that the decrease of saturation magnetization $\sigma$s can be retarded if the amount of Co is increased. It is however undesired in practical use because other problems are derived therefrom. Namely, if the Co concentration is too high, thermal instability and pressure instability are caused with a resultant change of the magnetic characteristics. Further, Co is expensive in cost, that is not suitable in practical application.

With respect to recorders of a coaxial circles type or a spiral type recording system using ferromagnetic powder whose ratio of average longer axis to average shorter axis in length is within the scope of 1.2 to 3.0, there has been disclosed in Japanese Patent Examined Publication No. 32408/1982. However, this type of magnetic recording media, e.g., the so-called floppy-disks, have so far been used, and the Hc of such well-known ferromagnetic powder is merely 20 to 400 Oe.

In the systems adopted in the present coaxial circles type or spiral type magnetic recording media, the Hc has been prescribed in a limited range, and in the said publication there was also no disclosure to improve the Hc of ferromagnetic powders in particular as well as to adopt to systems having a wider range of Hc. In the meanwhile, ferromagnetic powder having even higher Hc has been demanded in the new systems of this type of field, however, $\gamma$-Fe$_2$O$_3$ disclosed in the said Publication cannot satisfy such demand. In addition, the conventionally known Co-containing $\gamma$-Fe$_2$O$_3$ has had a problem in the thermal stabilization and has hardly been put into practical application.

In addition, Japanese Patent Publication Open to Public Inspection (hereinafter called Japanese Patent O.P.I. Publication) No. 98135/1982 discloses a tape type magnetic recording medium bearing at least not less than two magnetic layers thereon. It discloses that the acicular ratio of the ferromagnetic powder used in this magnetic recording medium is higher than 1 and lower than 3. In such a magnetic tape, a video tape in particular, having not less than two magnetic layers as disclosed in the described Publication, there are scattering of voices, brightness, picture noises and the like.

Further, dusts and dirts are apt to adhere to the coating surface of a magnetic layer to cause the so-called "Drop-out" phenomenon. This patent publication does not describe any proper Hc but merely describe the recording media in which $\gamma$-Fe$_2$O$_3$ having an extremely low coercive forces of 280 to 330 Oe or Fe-powder having a normal Hc of 900 to 1050 Oe.

In addition, Japanese Patent O.P.I. Publication No. 501053/1082 discloses a magnetic recording element made of a metal oxide having a metallic dope such as, preferably, Co, having an acicular ratio of not higher than 15 and preferably of 2 to 8 and the Hc of not lower than 450 Oe and preferably of not lower than 650 Oe. However, there is a problem of thermal stability in such magnetic recording media using a metal oxide of a metallic dope such as Co dope $\gamma$-Fe$_2$O$_3$.

SUMMARY OF THE INVENTION

It is an object of the invention to provide a high sensitivity and high density magnetic recording medium.

The inventors have variously studied of magnetic recording media and particularly of high density and high resolution magnetic recording media to be applied to the present video systems, and have been able to constitute a high density and high output magnetic recording medium which has not ever been obtainable in the prior art by lowering the acicular ratio of Co-adsorbed iron oxide or metallic magnetic powder and by giving a proper Hc to the magnetic powder finely granulated.

This invention is to eliminate the disadvantages that disturb the application of Co-adsorbed iron oxide magnetic powder or metallic magnetic powder to the present video system by increasing Hc of the metallic magnetic powder or by decreasing the saturation magnetization $\sigma$s of adsorbed $\gamma$-Fe$_2$O$_3$. Namely, the coercive force Hc is within the range of 550 to 800 Oe and the saturation magnetization Br is not decreased.

This invention is to provide a magnetic recording medium bearing a support base coated thereon with a magnetic layer containing ferromagnetic powder and the magnetic recording medium characterized in that the ferromagnetic powder is one selected from magnetic metallic powder and Co-adsorbed iron oxide magnetic powder whose grain size is not larger than $0.5\mu$ and the acicular ratio Ra and coercive force Hc are in the following relations, respectively;

$$1.3 \leq Ra \leq 4.5$$

$$550 \leq Hc \leq 800 \text{ Oersted}$$

There may be given the following alloys as the examples of magnetic metallic powder defined as those comprising a metal or a metal alloy without containing a metal compound such as $\gamma$-iron oxide: Fe, Ni, Co, Cr, Fe-Co-Ni, Fe-Ni-Zn, Fe-Mn-Zn, Fe-Al, MnBi, Fe-Al-P, Fe-Co-Ni-Cr, Fe-Co-Ni-P, Fe-Ni-Mn, Ni-Co, Fe-Ni, Co-Ni-P, Co-P, Fe-Ni-Cr-P, Fe-Ni-Cr-Zn, Co-P and inter alia, it is preferred to use a magnetic iron powder of which Fe is not less than 60% by weight and preferably not less than 80% by weight. As a small amount of additives, it is allowable to use, for example, Mg, Mn, Si, the other various elements and the compounds thereof. The grain size of the described ferromagnetic powder is not larger than 0.5 $\mu$m (e.g., 0.05–0.5 $\mu$m) and more preferably, not larger than 0.3 $\mu$m (e.g., 0.1–0.3 $\mu$m) for the purpose of high density recording.

As a Co-adsorbed iron oxide, Co-adsorbed $\gamma$-Fe$_2$O$_3$ is preferred among them. The amount of Co adsorbed is preferably 0.5 to 30% by weight and more preferably 2.5 to 30% by weight. If the amount of Co adsorbed is less than 0.5% by weight, the Hc is low, and if more than 30% by weight, thermal instability will be caused and the head of the video deck is also apt to be worn out.

As the materials of a support base (hereinafter called a support), there may be used polyethylene terephthalate; a polyester such as polyethylene-2,6-naphthalate and the like; a polyolefin such as polypropylene and the like; a cellulose derivative such as cellulose triacetate, cellulose diacetate and the like; a plastic such as polycarbonate and the like; a non-magnetic metal such as Al, Zn and the like; and a ceramic.

The thickness of the supports is of the order of about 3 to 100 $\mu$m and preferably 5 to 50 $\mu$m in the form of film or sheet, and of the order of 30 to 10 mm in the form of disk or card. In the case of a drum, the form thereof is to be cylindrical, and the shape will be determined in accordance with the recorder to be used.

The described supports may also be back-coated on the surface opposite to the surface provided thereon with a magnetic layer with the purposes of preventing an electric charge, an image transfer and the like.

There are described such back-coating in the following patent specifications; U.S. Pat. Nos. 2,804,401, 3,293,066, 3,617,378, 3,062,676, 3,734,772, 3,476,596, 2,643,048, 2,803,556, 2,887,462, 2,923,642, 2,997,451 3,007,892, 3,041,196, 3,115,420, 3,166,688 and the like.

The form of the supports may be anyone of tapes, sheets, cards, disks, drums and the like. Various materials may be selected according to the form to meet a necessity.

As the binders, conventionally well-known thermoplastic resins, thermosetting resins, reactive resins, electron-beam irradiation setting resins or mixtures thereof may be used.

As the thermoplastic resins, there are used those having a softening temperature of not higher than 150° C., an average molecular weight of 10,000 to 200,000 and a degree of polymerization of about the order of 200 to 2,000; for example, vinyl chloride-vinyl acetate copolymer, vinyl chloride-vinylidene chloride copolymer, vinyl chloride-acrylonitrile copolymer, an ester acrylate-acrylonitrile copolymer, an ester acrylate-vinylidene chloride copolymer, an ester acrylate-styrene copolymer, an ester methacrylate-acrylonitrile copolymer, an ester methacrylate-vinylidene chloride copolymer, an ester methacrylate-styrene copolymer, urethane elastomer, polyvinyl fluoride, vinylidene chloride-acrylonitrile copolymer, acrylonitrile-butadiene copolyer, polyamide resin, polyvinyl butyral, a cellulose derivative such as cellulose acetate butyrate, cellulose diacetate, cellulose triacetate, cellulose propionate, nitrocellulose and the like, styrene-butadiene copolymer, polyester resin, chlorovinyl ether-an ester acrylate copolymer, amino resin, various synthetic rubber types of thermoplastic resin, and mixtures thereof, and the like.

These resins are described in Japanese Patent Examined Publication Nos. 6877/1962, 12528/1964, 19282/1964, 5349/1965, 20907/1965, 9463/1966, 14059/1966, 16985/1966, 6248/1967, 11621/1967, 4623/1968, 15206/1968, 2889/1969, 17947/1969, 18232/1969, 14020/1970, 14500/1970, 18573/1972, 22063/1972, 22064/1972, 22068/1972, 22069/1972, 22070/1972 and 27886/1973; and U.S. Pat. Nos. 3,144,352, 3,419,420, 3,499,789 and 3,713,887.

The molecular weight of such thermoplastic resins or reaction type resins are not more than 200,000 when they are in the state of coating liquid and are infinite after a reaction such as a condensation reaction or an addition reaction and after they are coated and dried. Inter alia, it is preferred that such resins should not soften or fuse until they are thermally decomposed. More concretely, for example, they are phenol resin, polyurethane setting type resin, urea resin, melamine resin, alkyd resin, silicone resin, acryl type reactive resin, mixture of a macromolecular polyester resin and isocyanate prepolymer, mixture of a methacrylate copolymer and diisocyanate prepolymer, mixture of polyester polyol and polyisocyanate, mixture of urea formaldehyde resin/a low molecular glycol/a macromolecular diol/triphenyl methane isocyanate, polyamine resin, and mixtures thereof.

These resins are described in Japanese Patent Examined Publication Nos. 8103/1964, 9779/1965, 7192/1966, 8016/1966, 14275/1966, 18179/1967, 12081/1968, 28023/1969, 14501/1970, 24902/1970, 13103/1971, 22067/1972, 22072/1972, 22073/1972, 28045/1972, 28048/1972, and 28922/1972, and U.S. Pat. Nos. 3,144,353, 3,320,090, 3,437,510, 3,597,273, 3,781,210, and 3,781,211.

Electron-beam irradiation setting type resins include an unsaturated prepolymer such as maleic anhydride type, urethane acryl type, polyester acryl type, polyether acryl type, polyurethane acryl type, polyamide acryl type and the like; and multifunctional monomers include those of ether acryl type, urethane acryl type, phosphate acryl type, aryl type, hydrocarbon type and the like.

These binders are used independently or in combination, and besides, additives may be added if necessary.

The mixture proportion of ferromagnetic powder of the invention and the binders is within the range of 5 to 400 parts by weight, and preferably 10 to 200 parts by weight of the binders to 100 parts by weight of the ferromagnetic powders.

If the binders are used in excess thereof to produce a magnetic recording medium, the recording density of the recording medium is lowered. If used in too small an amount, the strength of a magnetic layer is weakened so that an unfavorable phenomenon such as the deterioration of durability, shedding and the like will occur.

To improve the ferromagnetic recording media relating to the invention to be more durable, various hardening agents such as a polyisocyanate, may be contained in a magnetic layer.

Such polyisocyanates include the addition product of diisocyanate and tervalent polyol, or a decarboxylated compound of diisocyanate pentamer/3 mole of diisocyanate/water.

The examples thereof include the addition product of 3 mole of tolylene diisocyanate/1 mole of trimethylol propane the, addition product of 3 mole of methaxylylene diisocyanate/1 mole of trimethylol propane, tolylenediisocyanate pentamer, pentamer comprising 3 mole of tolylene diisocyanate/2 mole of hexamethylene diisocyanate, the decarboxylated product obtainable by making 3 mole of hexamethylene diisocyanate react with 1 mole of water, and the like. These may readily be prepared in an industrial scale.

Magnetic layers containing the ferromagnetic powder of the invention, the described binders, and the hardening agents, may also contain such additives as a dispersing agent, coupling agent, lubricant, abrasives, antistatic agent and the like.

As for the dispersing agents, there may be used a fatty acid having 8 to 18 carbon atoms, such as caprylic acid, capric acid, lauric acid, myristic acid, palmitic acid, stearic acid, oleic acid, elaidic acid, linolic acid, linolenic acid and the like, which are represented by R—OOOH, wherein R represents a saturated or unsaturated hydrocabon group having 7 to 17 carbon atoms; a metallic soap comprising an alkali metal of the described fatty acide such as Li, Na, K, etc., or an alkaline earth metal such as Mg, Ca, Ba, etc. Besides, a higher alcohol having not less than 12 carbon atom, a sulfate and the like can also be used. These dispersing agents may be used independently or in combination. These dispersing agents are to be added within the range of 1 to 20 parts by weight to 100 parts by weight of the described powder.

These dispersing agents are described in Japanese Patent Examined Publication Nos. 28369/1964, 17945/1969, and 1500/1973, and U.S. Pat. Nos. 3,587,993, and 3,470,021, and the like.

The coupling agents for excellently dispersing the ferromagnetic powder which were finely powdered as mentioned above, includes isopropyl triisostearoyl titanate, isopropyl tridecyl benzene sulfonyl titanate, isopropyl tri(dioctyl pyrophosphate)titanate, tetraisopropyl bis(dioctyl phosphite)titanate, tetraoctyl bis(ditridecyl phosphite)titanate, tetra(2,2-diallyloxymethyl-1-butyl)bis(di-tridecyl phosphite)titanate, bis(dioctyl pyrophosphate)oxyacetate titanate, bis(dioctyl pyrophosphate)ethylene titanate, and the like. The ferromagnetic powder may be treated in advance or may also be added into a magnetic paint.

The lubricants, which can be used include silicon oil, carbon black, graphite, carbon black graft polymer, molybdenum disulfide, tungsten disulfide, a fatty acid ester, i.e., a wax, comprising a monobasic fatty acid having 12 to 16 carbon atoms and a monovalent alcohol whose carbon atom number is to have 21 to 23 if adding the carbon atom number of the described monobasic fatty acid to the carbon atom number thereof. These lubricants may be added within the range of 0.2 to 20 parts by weight thereof to 100 parts by weight of the described powder. These lubricants are described in Japanese Patent Examined Publication Nos. 23889/1968, 81543/1968 and the like; U.S. Pat. Nos. 3,470,021, 3,492,235, 3,497,411, 3,523,086, 3,625,760, 3,630,772, 3,634,253, 3,642,539, and 3,687,725; IBM Technical Disclosure Bulletin, vol. 9, No. 7, p. 779 (December 1966); Electronik 1961, No. 12, p. 380; and the like.

The abrasives which can be used include fused alumina, silicon carbide, chromium oxide, corundum, artificial corundum, diamond, artificial diamond, garnet, emery mainly comprising corundum and magnetite, and the like. They are used in the average particle size of 0.05 to 5$\mu$ and more preferably, 0.1 to 2$\mu$. They are added within the range of 1 to 20 parts by weight to 100 parts by weight of the powder. These abrasives are described in Japanese Patent O.P.I. Publication No. 115510/1974; U.S. Pat. Nos. 3,007,807, 3,041,196, and 3,687,725; British Pat. No. 1,145,349; and West German Patent (DT-PS) No. 853,211.

The antistatic agents which can be used include an electroconductive powder such as graphite, carbon black, tin oxide-antimonium oxide type compounds, tin oxide-titanium oxide-antimonium oxide type compounds, carbon black graft polymer and the like; natural surface active agents such as saponin; nonionic surface active agents such as alkylene oxide type, glycerol type, glycidol type or the like; cationic surface active agents such as higher alkylamine type, quaternary ammonium salt type, heterocyclic type of pyridine or the like, cationic surface active agents such as phosphonium or sulfonium type, or the like; anionic surface active agents containing such an acid radical as carbonic acid, sulfonic acid, phosphoric acid, sulfate, phosphate or the like; amphoteric surface active agents such as amino acid type, aminosulfonic acid type, sulfate or phosphate of aminoalcohol; and the like.

The surface active agents capable of serving as the abovementioned antistatic agents are described in U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174, and 3,545,974; West German Patent (OLS) No. 1,942,665; British Pat. Nos. 1,077,317, and 1,198,450; and the like patents; Ryohei Oda, "Synthesis and Application of Surface Active Agents", Maki Bookstore, Japan, 1964; A. M. Schwartz & J. W. Perry, "Surface Active Agents", Interscience Publication, Inc., 1958; J. P. Sisley, "Encyclopedia of Surface Active Agents", vol. 2, Chemical Publishing Co., 1964; "A Handbook of Surface Active Agents", 6th ed., Sangyo Tosho K. K., Dec. 20, 1966; and the like.

These surface active agents may be added independently or in combination. these surface active agents are to be used as antistatic agents, and there are also some instances where they are used with the other purposes of, for example, dispersing, improving the magnetic characteristics and lubricity, and serving as a coating aid.

The solvents for magnetic coatings to be used in a magnetic coating process, include solvents of ketone type such as acetone, methylethyl ketone, methylisobutyl ketone, cyclohexanone or the like; those of alcohol type such as that of methanol, ethanol, propanol, butanol or the like; those of ester type such as that of methyl acetate, ethyl acetate, butyl acetate, ethyl lactate, glycol acetate monoethyl ether, or the like; those of glycol ether type such as that of glycol dimethyl ether, glycol monoethyl ether, dioxane, or the like; those of aromatic hydrocarbon type such as that of benzene, toluene, xylene or the like; those of halogenated hydrocarbon type such as that of methylene chloride, ethylene chloride, carbon tetrachloride, chloroform, dichlorobenzene or the like.

Ferromagnetic powder of the invention, binders, dispersing agents, lubricants, abrasives, antistatic agents, solvents and the like are mixedly kneaded to prepare magnetic coatings.

When mixedly kneading, the abovementioned ferromagnetic powder and each of the above components are put into a kneading machine altogether at the same time or one by one in order. For instance, there is a process for preparing a magnetic paint, wherein the above ferromagnetic powder is added first to a solution containing a dispersing agent and kneaded for a prescribed period. Then, each of the other components is added and kneaded, and thus a magnetic coating is prepared.

When mixedly kneading and dispersing, various types of kneading machines may be used. For instance, they may be a double roller mill, triple roller mill, ball mill, pebble mill, sand grinder, Szegvari attriter, high-speed impeller dispersing machine, high-speed stone mill, high-velocity impact mill, disper-kneader, high speed mixer, homogenizer, ultrasonic dispersing machine and the like.

The technique of kneading-dispersion is described in T.C. Patton, "Paint Flow and Pigment Dispersion", John Wiley & Sons, 1964, and in U.S. Pat. Nos. 2,581,414 and 2,855,156.

As a coating method for forming a magnetic layer by coating the above-mentioned magnetic coating on a support, there can be utilized air-knife coating, air-doctor coating, blade coating, reverse roll coating, gravure coating, transfer roll coating, kiss coating, cast coating, spray coating, squeeze coating and the like. Other methods may also be used and the details of such methods are described in "Coating Engineering", Asakura Bookstore, 1971.

A magnetic layer which was coated on a support in such a coating method as mentioned above is treated, if necessary, to orient the ferromagnetic powder of the invention contained in the layer, and then the magnetic layer thus formed is dried. If also necessary, the surface of the layer is processed to be smooth and is cut into a desired size to prepare a magnetic recording medium of the invention.

It is desired in this case that the oriented magnetic field is of A.C. or D.C. the order of about 500 to 3500 Gauss; the drying temperature is of the order of about 50° to 100° C.; and the drying time is of the order of about 3 to 10 minutes.

The following apply to the magnetic recording media of the present invention:

(1) The thickness of a magnetic layer can be thinned to, for example, $1.2\mu$ to $3.8\mu$; Inside of a magnetic layer can be prevented from forming a diamagnetic field; and thus a higher density recording can be performed as compared with those of conventional magnetic recording media; because of the finely pulverized ferromagnetic powders.

(2) The distribution of Hc caused by scattering of fragments of ferromagnetic powder is decreased and thus a less transferable magnetic recording medium can be prepared; because the acicular ratio is low so that the ferromagnetic powders are rarely to be broken when they are dispersed.

(3) Oriented magnetic field of high strength is not needed to increase the degree of orientation; and the roughness caused thereby on the surface of the magnetic layer can be reduced; because of the low acicular ratio of the ferromagnetic powder.

(4) Not only the signal-to-noise ratio (S/N) is excellent because of the finely pulverized ferromagnetic powder, but also the binder-to-ferromagnetic powder proportion can suitably be adjusted because of the high saturation magnetization $\sigma s$.

(5) A high output recording medium can be prepared.

(6) Quantity and quality of binders having a strong physical property of the coating can be selected.

(7) Especially with a magnetic recording medium relating to the invention in which ferromagnetic metal powder is used, the preservability against a change on standing of thus prepared magnetic recording media can be excellent, because the tip (which is apt to be stained) of a highly active acicular crystal can be smaller than those of conventional ferromagnetic metal powder having an acicular which is high.

(8) Particularly when the ferromagnetic powder is a magnetic metal powder, it is possible to use them in the present video systems because the acicular ratio thereof is as low as 1.3 to 4.5, and Hc is 550 to 800 Oe and preferably 580 to 700 Oe; and a high output magnetic recording medium can be obtained because the high saturation magnetization $\sigma s$ which is originally displayed by magnetic metal powder can be utilized, and (9) Unexpectedly, the durability of an image in the still is remarkably excellent in comparison with the conventional ones.

In the invention, "Co-adsorbed iron oxide" is defined as Co that is adsorbed to the surface of iron oxide which has been prepared in the process wherein Goethite is changed into $\gamma$-iron oxide, for example, in a dehydration process and successively in a reduction process and an oxidation reaction, and then the iron oxide is mixed into an alkaline solution for example to add $CoSO_4$ and $FeSO_4$ (or $CoSO_4$ only) thereto. Accordingly, the case of "Co-adsorbed" of the invention is different from the other cases such as the case of Co-doped, Co-singly coprecipitated or the like from the viewpoint of Co-contained, and is also different from the case of the conventional "Co-contained iron oxide". For example, the case of Co-adsorbed of the invention is further different from the case of "Co-doped iron oxide" described in Japanese Patent O.P.I. Publication No. 501053/1982 and is still further different from the case of iron oxide coprecipitated with Co-ion at the final stage of the reaction of the growth of Goethite described in Example 3 of Japanese Patent O.P.I. Publication No. 98135/1982. Comparing with these publicly known "Co-contained iron oxide", "Co-adsorbed iron oxide" relating to the invention is superior thereto in thermal stability, and thus an excellent magnetic recording medium can be provided as mentioned later.

Further, the abovementioned "fine pulverization" means that the grain size of magnetic powder is to make smaller, and in the invention the grain size thereof is not larger than 0.5μ and preferably not larger than 0.3μ for further higher density recording.

DETAILED DESCRIPTION OF THE EMBODIMENTS

The following are the detailed description of the invention with reference to the control examples and the examples of the invention. The word, a "part" appeared in the examples means a "part by weight".

CONTROL EXAMPLE 1

| | |
|---|---|
| Magnetic powders of an Fe alloy of which the acicular ratio is 8 and the grain size is 0.4μ | 75 parts |
| Vinyl chloride-vinyl acetate copolymer, "VAGH", mfd by Union Carbide Co. | 5 parts |
| Polyurethane resin, "Estane-5701" mfd by Goodrich Co. | 9 parts |
| Methylethyl ketone | 70 parts |
| Toluene | 60 parts |
| Cyclohexane | 5 parts |
| Tetraisopropyl bis(dioctyl phsphite)titanate | 1.5 parts |

The abovementioned composition was thoroughly mixed and dispersed, and then five parts of "Colonate L", (a polyisocyanate solution, mfd. by Nippon polyurethane Co.) were added to the resulting dispersed mixture, and thus a magnetic paint was prepared by uniformly mixing. The obtained magnetic paint was coated onto one side of polyethylene terephthalate base of 12μ in thickness so that the coating thickness can be 5μ, with a magnetic field of 2000 Gauss being applied thereto and drying.

The obtained sample of wide width was treated in a super-calender process and was then slitted into 12.65 mm each to obtain video-tapes as the control sample No. I-(0).

EXAMPLES 1–5

| | |
|---|---|
| Magnetic powder of Fe metals of which the acicular ratio is 3 and the grain size is 0.3μ | 75 parts |
| VAGH | 5 parts |
| Polyurethane resin, "Estane-5701" mfd. by Goodrich Co. | 9 parts |
| Methylethyl ketone | 70 parts |
| Toluene | 60 parts |
| Cyclohexane | 5 parts |
| Tetraisopropyl bis (dioctyl phosphite) titanate | 1.5 parts |

The abovementioned composition was thoroughly mixed and dispersed, and then five parts of "Colonate L" were added to the resulting dispersed mixture, and thus a magnetic paint was prepared by uniformly mixing. The obtained magnetic paint was coated onto one side of polyethylene terephthalate base 12μ thick so that the coating thickness can be 5μ, with a magnetic field of 2000 Gauss being applied thereto and drying.

The obtained sample of wide width was treated in a super-calender process and was then slitted into 12.65 mm each to obtain video-tapes as the control sample No. I-(1).

As the iron alloy magnetic powder in the abovementioned composition, Fe-Co-Ni magnetic powder in the configurations of the acicular ratios and the grain sizes of 4 and 0.2μ; 4 and 0.3μ; 2.5 and 0.3μ; 3.5 and 0.3μ; and 4.2 and 0.2μ; respectively, are used in place of those of the acicular ratio of 3 and the grain size of 0.3μ. They were thoroughly mixedly dispersed by means of a ball mill as were done similarly in the above case, and five parts of "Colonate L" were added thereto and were then uniformly mixed up. The obtained magnetic paints were each coated onto one side of respective polyethylene terephthalate bases so that the coating thickness can be 5μ with applying magnetic fields thereto and drying. Further, super-calender processes were applied respectively to prepare video tapes of 12.65 mm in width. Thus prepared video tapes were called Samples I-(1), I-(2), I-(3), I-(4), and I-(5), respectively.

Table-1 below shows the measurement results of the performance of the tapes of thus obtained Control Sample I-(0) and Samples I-(1), I-(2), I-(3), I-(4) and I-(5) obtained in Examples 1–5.

TABLE 1

| | Performance | | | | |
|---|---|---|---|---|---|
| Sample | Ra | Grain size (μ) | −Hc (Oersted) | RF Output | Chrom. S/N (dB) | Gloss % |
| I-(0) | 8 | 0.4 | 1050 | 0 | 0 | 148 |
| I-(1) | 3 | 0.3 | 580 | +0.5 | +0.6 | 153 |
| I-(2) | 4 | 0.2 | 700 | +1.0 | +2.2 | 168 |
| I-(3) | 2.5 | 0.3 | 650 | +1.0 | +1.2 | 158 |
| I-(4) | 3.5 | 0.3 | 600 | +0.7 | +0.7 | 157 |
| I-(5) | 4.2 | 0.2 | 750 | +2.3 | +2.5 | 160 |

In the table, (a) Radio frequency output

RF output were measured at 4 MHz by means of a video deck for measuring RF output, and the results thereof are shown as the relative values to that of the output of Control Sample I-(0) that is taken as 0.

(b) Chrominance S/N

Chrominance signal of 3.58 MHz was set at 0.714 Vp-p to make a picture recording by putting the chrominance signal into a brightness modulation signal, and the chrominance signal was solely taken out by reproducing the recorded picture to obtain the ratios of the effective values (S) to the noise levels (N) from which the level of the chrominance signal was removed. The ratios are exhibited by the unit of dB.

(c) Degrees of gloss (which were measured by Glossmeter GL-26D mfd. by Murakami Color Research Labs., Japan).

The degrees of gloss are expressed as the relative values in the term of percentage to which the degree of gloss obtained from a black tile made control sample is provided as 100% when they are reflected by light with the angle of 60° to the surfaces thereof. The higher the values are, the higher the outputs are.

According to the results shown in Table-1, there shows in the case of Fe-type magnetic powder relating to the invention that Hc is apparently between 580 and 750 Oe when the acicular ratio is between 1.3 and 4.5, that is, the Hc thereof are far smaller than those (of the order of 900–1200 Oe) of the ordinary metal type ferromagnetic powder. When the acicular ratio becomes not greater than 1.3 and the powder becomes nearly globular, the form magnetic anisotropy becomes smaller and the magnetic anisotropy for tapes is missed out. When the acicular ratio is not lower than 4.5, the magnetic powder is apt to be broken and the Hc is distributed, so that the magnetic powder will become unsuitable for a high density recording.

CONTROL EXAMPLE 2

| | |
|---|---|
| Co-adsorbed-$\gamma$-$Fe_2O_3$ (Acicular ratio: 11; Grain size: 0.3$\mu$) | 75 parts |
| VAGH | 5 parts |
| "Estane 5701" mfd. by Goodrich Co. | 9 parts |
| Methylethyl ketone | 70 parts |
| Toluene | 60 parts |
| Cyclohexanone | 5 parts |
| Isopropyl tris(dioctyl pyrophosphate)titanate | 1.5 parts |

The abovementioned composition was thoroughly mixed and dispersed, and then five parts of "Colonate L" were added to the resulting dispersed mixture, and thus a magnetic paint was prepared by uniformly mixing. The obtained magnetic paint was coated onto one side of polyethylene terephthalate base 12$\mu$ thick so that the coating thickness can be 5$\mu$, with a magnetic field of 2000 Gauss being applied thereto and drying.

The obtained sample of wide width was treated in a super-calender process and was then slitted into 12.7 mm to obtain video-tapes and the control sample No. II-(0).

EXAMPLES 6–10

| | |
|---|---|
| Co-adsorbed-$Fe_2O_3$ | 75 parts |
| VAGH | 5 parts |
| "Estane 5701" mfd. by Goodrich Co. | 9 parts |
| Methylethyl ketone | 70 parts |
| Cyclohexanone | 5 parts |
| Isopropyl tris(dioctyl pyrophosphate)titanate | 1.5 parts |

The abovementioned compositions of which the acicular ratios of Co-adsorbed-$\gamma$-$Fe_2O_3$ powder were 4.2, 4, 3.5, 3 and 2.5, respectively, were thoroughly mixedly dispersed by a ball mill and five parts of "colonate L" were added thereto and were then uniformly mixed up. The obtained magnetic paints were each coated onto one side of respective polyethylene terephthalate bases with applying magnetic fields of 2000 Gauss, and were then dried up so that the thickness can be 5$\mu$ each. The obtained samples of wide width were treated in super-calender process and were then slitted into 12.65 mm in width to obtain video-tapes as the Control Samples No. II-(1), II-(2), II-(3), II-(4) and II-5, respectively.

Table-2 below exhibits the measurement results of the tape performance i.e., Hc, RF outputs in dB, chrom S/N ratios and the degrees of gloss of Sample Nos. II-(1), II-(2), II-(3), II-(4) and II-(5) and Control Sample No. II-(0).

TABLE 2

| | | | Performance | | | |
|---|---|---|---|---|---|---|
| Sample | Ra | Grain size ($\mu$) | −HC (Oersted) | RF Output | Chroma S/N (dB) | Gloss % |
| II-(0) | 11 | 0.3 | 680 | 0 | 0 | 150 |
| II-(1) | 4.2 | 0.2 | 550 | +0.9 | +0.8 | 163 |
| II-(2) | 4 | 0.3 | 580 | +0.9 | +0.5 | 148 |
| II-(3) | 3.5 | 0.3 | 650 | +1.3 | +0.8 | 168 |
| II-(4) | 3 | 0.3 | 630 | +1.5 | +0.8 | 168 |
| II-(5) | 2.5 | 0.4 | 700 | +2.0 | +1.2 | 170 |

From the contents of Table-2, even in the case of Co-adsorbed-$\gamma$-$Fe_2O_3$ magnetic powder, it is needless to say that the form anisotropy becomes smaller when the acicular ratio is not higher than 1.3, and it is found that they are not preferred to be a magnetic recording medium because the magnetic powder is apt to be broken and the Hc is distributed to cause an image transfer trouble, when the acicular ratio thereof is not lower than 4.5.

The above pointed out characteristics are common not only to Fe type alloy magnetic powder and Co-adsorbed-$\gamma$-$Fe_2O_3$ magnetic powder but also to the other metal type ferromagnetic powder and the other Co-adsorbed iron oxide.

EXAMPLE 11

With the purpose of investigating the durability of still images of Sample Video Tapes II-(2) and II-(4) which were obtained in Examples 7 and 9, the changes on standing of the still images thereof were measured by means of a video deck, NV-6200, mfd by Matsushita Electric Industrial Co., Ltd., Japan. On the other hand, the measurements were made on the Sample Video Tape II-(0) obtained, as a control sample, in Control Example-2. The results thereof are shown in Table-3 below.

TABLE 3

| Sample No. | Characteristics Results of Measurements |
|---|---|
| (Invention) II-(2) | Excellent still images were displayed even after a lapse of over four hours. |
| (Invention) II-(4) | Excellent still images were displayed even after a lapse of over four hours. |
| (Control) II-(0) | Images almost disappeared after a lapse of one hour. |

We claim:

1. A magnetic recording medium comprising a support and a magnetic layer on said support, said magnetic layer being a unitary magnetic layer comprising ferromagnetic metallic powder, the average grain size of said ferromagnetic powder being not more than 0.5$\mu$, the ratio of the major axis to the minor axis (acicular ratio) of said powders being from 1.3 to 4.5 and the coercive force of said powders being from 550 to 800 Oe.

2. The magnetic recording medium according to claim 1, wherein said ferromagnetic metallic powder is selected from the group consisting of Fe-, Ni-, Co- and Cr-containing powder.

3. The magnetic recording medium according to claim 1, wherein said ferromagnetic powder is an iron-containing metallic powder.

4. The magnetic recording medium according to claim 3, wherein said iron-containing metallic powder is selected from the group consisting of Fe-Co-Ni, Fe-Ni-Zn, Fe-Al, Fe-Al-P, Fe-Co-Ni-Cr, Fe-Co-Ni-P, Fe-Ni, Fe-Ni-Mn, Fe-Ni-Cr-P and Fe-Ni-Co-Zn.

5. The magnetic recording medium according to claim 3, wherein said iron-containing metallic powder contains iron in an amount of not less than 60% by weight.

6. The magnetic recording medium according to claim 3, wherein said ferromagnetic powder is an iron-containing metallic powder containing iron in an amount of not less than 80% by weight.

7. The magnetic recording medium according to claim 6, wherein said ferromagnetic layer also contains a binder in an amount of between 10 and 100 parts by weight per 100 parts by weight of said ferromagnetic powder and wherein said average grain size of said ferromagnetic powder is between 0.05 micron and 0.5 micron.

8. The magnetic recording medium according to claim 7, wherein said binder is selected from the group consisting of thermoplastic resins, thermosetting resins, radiation curable resins, reactive resins, electron-irradiation-setting resins and mixtures thereof and wherein said support is a polymeric material selected from the group consisting of polyesters, polyolefins, cellulose derivatives, polycarbonate, polyvinylchloride, polyimide and nylon.

9. The magnetic recording medium according to claim 8, wherein said average grain size of said ferromagnetic powder is between 0.1 micron to 0.3 micron.

10. The magnetic recording medium according to claim 8, wherein said support is a non-magnetic metal support of aluminum, zinc or an alloy thereof and wherein said average grain size of said ferromagnetic powder is between 0.1 micron to 0.3 micron.

11. The magnetic recording medium according to claim 1, wherein said ferromagnetic magnetic layer also contains a binder.

12. The magnetic recording medium according to claim 11, wherein said binder is contained in said magnetic layer at a proportion of 5 to 400 parts by weight relative to 100 parts by weight of of said ferromagnetic powder.

13. The magnetic recording medium according to claim 11, wherein said binder is contained in said magnetic layer in an amount of 10 to 100 parts by weight per 100 parts by weight of said ferromagnetic powder.

14. The magnetic recording medium according to claim 11, wherein said binder is selected from the group consisting of thermoplastic resins, thermosetting resins, radiation curable resins, reactive resins, electron-irradiation-setting resins and mixtures thereof.

15. The magnetic recording medium according to claim 1, wherein said support is selected from the group consisting of polymeric resins, non-magnetic metals and ceramics.

16. The magnetic recording medium according to claim 15, wherein said support is a polymeric resin selected from the group consisting of polyesters, polyolfins, cellulose derivatives, polycarbonate, polyvinylchloride, polyimide and nylon.

17. The magnetic recording medium according to claim 15, wherein said support is a non-magnetic metal support of aluminium, zinc or an alloy thereof.

18. The magnetic recording medium according to claim 15, wherein said support is in the form of film or sheet, card, disc or cylindrical drum.

19. The magnetic recording medium according to claim 1, wherein said average grain size of said ferromagnetic powder is between 0.05 micron to 0.5 micron.

20. The magnetic recording medium according to claim 1, wherein said average grain size of said ferromagnetic powder is between 0.1 micron to 0.3 micron.

* * * * *